United States Patent [19]
Cassen

[15] 3,659,103
[45] Apr. 25, 1972

[54] RADIATION SCANNING DEVICE FOR DETECTING A PLURALITY OF DIFFERENT RADIATING SOURCES POSITIONED IN DIFFERENT PLANES

[72] Inventor: Benedict Cassen, Pacific Palisades, Calif.

[73] Assignee: The Regents of the University of Calif., Berkeley, Calif.

[22] Filed: Aug. 4, 1969

[21] Appl. No.: 847,086

[52] U.S. Cl. ............................... 250/71.5 S, 250/83.3 R
[51] Int. Cl. ............................................. G01t 1/20
[58] Field of Search ............................ 250/71.5 S, 83.3 R

[56] References Cited

UNITED STATES PATENTS 3,221,731  12/1965  Annis et al. .................. 250/71.5 S
3,509,341  4/1970   Hindel et al. ................. 250/71.5 S
3,465,145  9/1969   Leiter .......................... 250/71.5 S Primary Examiner—Archie R. Borchelt
Attorney—Jessup & Beecher

[57] ABSTRACT

A radioisotope detection system is provided in which signals emitted by radioactive particles disposed at different depths in a body under observation are collimated in separate collimating channels which are scanned rectilinearly over the body and whose axes are distributed over a solid angular range. The signals from the individual collimating channels are separately stored in a memory system, such as on different channels on a magnetic tape. The signals recorded in the different channels may subsequently by played back with an adjustable relative time relationship, and the various signals may be controllably superimposed on one another so that the radioactive elements in any plane in the body under observation may be selected for display and study, or a three-dimensional display may be exhibited.

7 Claims, 6 Drawing Figures

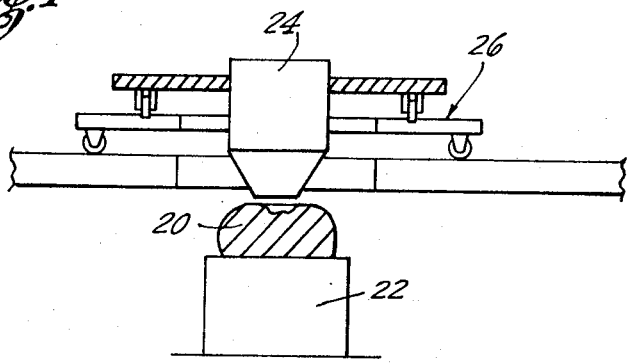
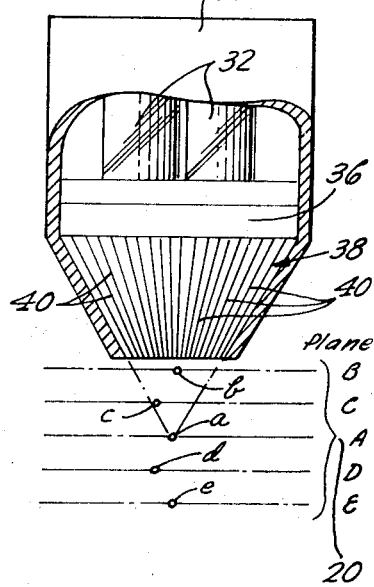
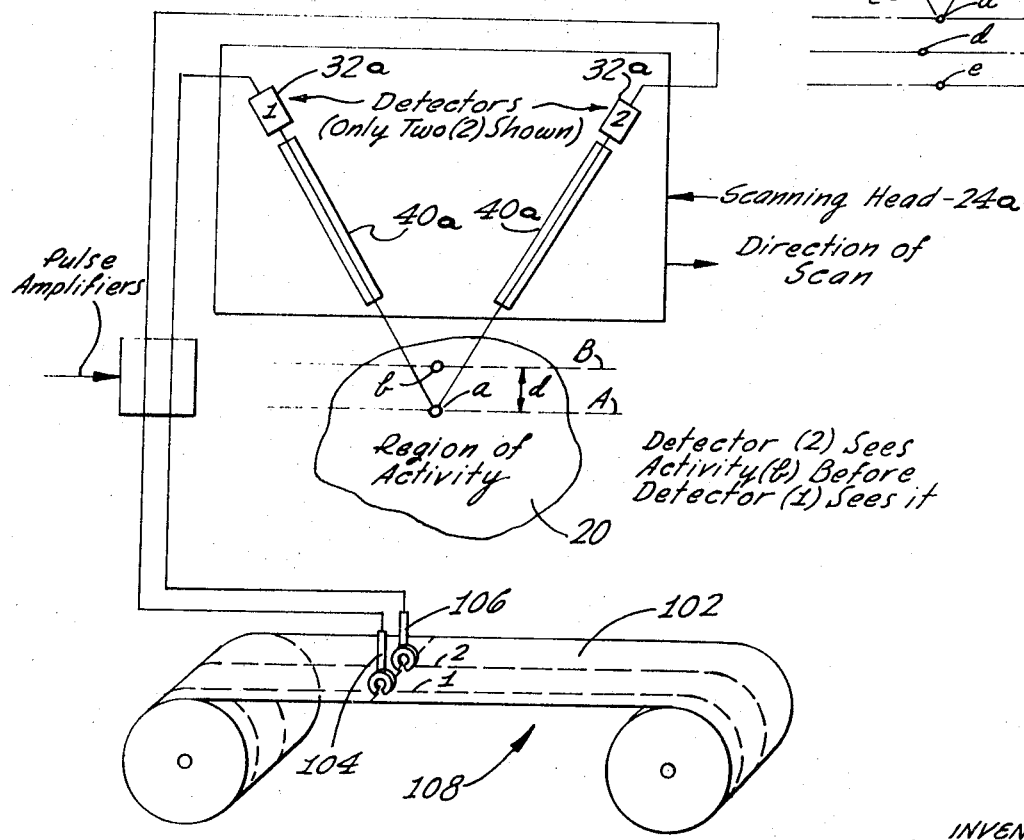

Playback for Plane A

Preset Calculated Time Delay

Playback for Plane B 3,659,103

RADIATION SCANNING DEVICE FOR DETECTING A PLURALITY OF DIFFERENT RADIATING SOURCES POSITIONED IN DIFFERENT PLANES

This invention was made in the course of, or under, Contract AT(104 –1) GEN–12 with the Atomic Energy Commission of the United States of America.

BACKGROUND OF THE INVENTION

The radioisotope detection system forming the subject matter of this application is of the same general type as the apparatus and system disclosed and claimed in application Ser. No. 646,804 which was filed June 15, 1967, for "Tomographic Gamma-Ray Scanner with Simultaneous Read-Out of Several Planes," and in the name of Hal O. Anger.

As mentioned in the said application, it is common to introduce radioactive substances into subjects, such as medical patients, and to trace the flow of the radiating substance and to observe concentrations thereof in areas or organs of the patient for diagnostic purposes. As also mentioned in the copending application, scintillation image detectors of the type described, for example, in U.S. Pat. No. 3,011,057, are suitable for this purpose, when used in conjunction with a usual radioisotope scanning device of the type described, for example, at pages 381–387 of Instrumentation in Nuclear Medicine by Gerald J. Hine, Academic Press, New York 1967.

However, a drawback in the type of apparatus referred to in the preceding paragraph, is its ability to produce only a single two-dimensional read-out of the radiation sources, as viewed in a single plan view, and without discrimination as to the depth of the radiation sources within the subject. The apparatus may be equipped with a focused collimator, and focused to a particular depth within the body. However, again the limitation arises, in that only the radiation sources at that particular depth are sharply focused by the prior art system.

The apparatus and system described in the Anger application is capable of providing in a single scan of the subject a plurality of high resolution read-outs of the distribution of radioactivity in the subject, each being "focused" at a different depth. Radiation sources above or below each read-out plane for any particular read-out are "out-of-focus" in that read-out in the Anger system. Then, by noting the read-out which shows a particular source or object most sharply, the depth of that source or object can be determined.

The system and apparatus of the present invention is also capable of providing in a single scan all the information necessary for the subsequent display of radiation sources at any selected depth within the subject, or of a three-dimensional representation of the depth of the various radioactive elements within the subject.

In brief, therefore, both the system described in the Anger application, and the system of the present invention, provide a radiation detecting system and apparatus for imaging the distribution of radioactive substances within a three-dimensional subject, such as a medical patient. The radioactive substances introduced into the subject in both cases are viewed by a radiation image detector which provides an image of the distribution of radiating sources within its field of view. Then by viewing the area of interest from two or more positions, as by scanning the detect or over the subject, the radiating sources sensed by the detector have relative positions which are a function of their depth within the subject.

The images sensed by the detector are transformed into output signals which, in the case of the present invention, are recorded on an appropriate memory, such as on separate channels of a magnetic tape. The signals from the various channels may subsequently be read at different mutual time relationships, as will be described, effectively to cause the system to sense various depths in the subject under observation.

A primary objective of the present invention, therefore, is to provide a system and apparatus which is capable to determine accurately and precisely the locations of radioisotope elements within a three-dimensional body, which information is most desirable, for example, in the diagnosis of diseases and in making pre-operative decisions.

SUMMARY OF THE INVENTION

A system and apparatus is provided of the type described above, in which information is obtained by a single rectilinear scan by means of a series of separate collimating channels, and such information is separately stored on an appropriate memory, such as on separate channels on a magnetic tape. The information is then played back from the tape at the convenience of the operator, and the time relations between the signals read back from the various channels on the tape may be adjusted at will to demonstrate the radioisotope distribution in any plane in the body under investigation. The apparatus has a unique advantage in that it is not limited to any pre-selected plane, but enables the operator to view effectively any desired plane in the subject, and even may provide a three-dimensional display, as will be described.

An ancillary advantage in the practice of the present invention is that the recorded information may be edited, so that all areas showing no radiation activity may be deleted, and only critical information is placed in the permanent memory storage, in order to minimize and economize on records which are to be kept, for example, for long periods of time.

The embodiment of the invention to be described includes a scanning head incorporating a plurality of collimator channels. It will be evident to those skilled in the art, however, that such a scanning head may be replaced by, for example, one incorporating a pinhole pinhole The pinhole camera type of scanning head has some advantages in that it is lighter in weight, less cumbersome and less bulky than the scanning head using collimating members. A ring of detectors may be provided in the pinhole camera type of head, which would correspond in number to the number of collimator members in the original head, with the pinhole being common to all the channels.

BRIEF DESCRIPTION OF THE DRAWINGS

FIG. 1 is a fragmentary sectional elevation of a tomographic scanner for rectilinearly scanning a three-dimensional body, such as may be used in the system described in the co-pending application;

FIG. 2 is a view, partly in section, showing a gamma-ray image probe which may be used in the tomographic scanner of FIG. 1, and which is generally representative of the structural configuration of a probe which may be used in the system of the invention;

FIG. 3 is a schematic representation of a system embodying the invention, and which may incorporate a scanner and probe of the type shown in FIGS. 1 and 2;

DETAILED DESCRIPTION OF THE ILLUSTRATED EMBODIMENT

Figure 4:
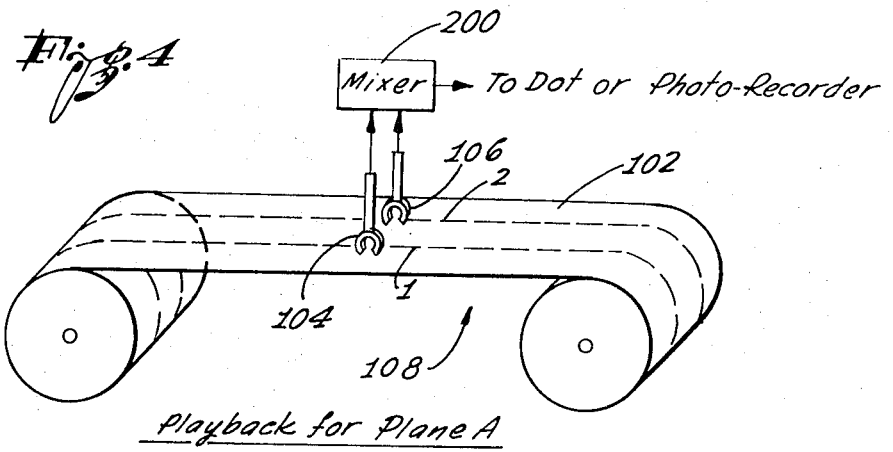
FIG. 4 is a schematic representation of the manner in which certain signals may be read from a magnetic recording tape in the practice of the invention.

As mentioned above, the system described in the Anger application illustrates the possibility of scanning in focus several sections in depth simultaneously with a focused collimator. In the Anger system, focused images are formed from what would ordinarily be smeared-out images by means of an optical system with moving components.

In the practice of the present invention, however, and as explained above, signals are recorded on a tape from individual collimating channels, while an array of such channels, all at different angles and azimuths from the vertical, scans a three-dimensional distribution of a gamma ray emitting radioisotope. Then, in the practice of the invention, the signals recorded on the magnetic tape may subsequently be played back and superimposed at suitably displaced relative times so that a focused image may be presented for a selected plane at any depth or any angle within the three-dimensional body. It will become evident as the description proceeds that it is not necessary for the collimating channels to focus to a common point, and this feature facilitates the collimator design.

It will also be evident as the description proceeds that the signal from an individual collimating channel must be separately identifiable, either by means of small individual detectors, or by coordinates of the scintillations in a slab crystal by the methods used in known scintillation camera structures. However, in the case under consideration, the coordinate does not represent the actual position in an image.

The apparatus shown in FIGS. 1 and 2 includes a collimator 38 for producing radiation images of radiating sources A, B, C, D and E in a subject 20 to be examined. One of the characteristics of the collimator is that the relative positions of the radiation images of sources in different locations within the subject will vary with the relative position between the collimator and the subject. The radiation images from the sources are converted into output signals by an appropriate radiation image detector which may be of the type shown and described in detail in Anger U.S. Pat. No. 3,011,057.

The principal components of the image detector are as a scintillator 36 mounted at the exit end of the collimator 38; an array of phototubes 32 disposed with their light sensitive elements facing the scintillator and spaced a short distance therefrom. These elements are all supported within a single radiation image probe or head 24, which in turn, is supported on a scanning frame 26 to permit to be scanned rectilinearly over the three-dimensional subject 20 under investigation. The scanning frame permits the probe 24 to be moved across the subject 20 so as to provide output signals defining the relative positions between the collimator and the subject, as will be described in more detail subsequently.

The collimator 38, for example, may be a standard commercial unit of the type manufactured by Ohio Nuclear Corporation of Cleveland, Ohio. These particular collimators have approximately 100–600 tapered channels, the axis of each channel being aligned towards a focal point that is commonly 3-½ inches from the entrance face, although, as mentioned above, the system and apparatus of the invention does not actually require a focused type collimator. Such collimators are made for use, for example, with 3-inch, 5-inch or 8-inch scintillators, the 8-inch size being preferable in the case under consideration. Various types of scintillators are commercially available. The preferred scintillator at present is a thallium-activated sodium iodide crystal manufactured by Harshaw Chemical Company of Cleveland, Ohio. These scintillators are available in various sizes, with a crystal of about 8-½ inches in diameter and 1 inch to 1-½ inches thick being suggested for present purposes.

An array of phototubes such as shown in U.S. Pat. No. 3,011,057 is preferably used in the probe 24. These phototubes may be conventional three inch bi-alkalie photocathode tubes with copper beryllium dinodes, such as manufactured by the Radio Corporation of America.

The scanning frame itself and its power drives are commercially available as a single unit, and are manufactured, for example, by Ohio Nuclear Corporation of Cleveland, Ohio. The Ohio Nuclear unit provides rectilinear scanning motion for he radiation image probe 24 at scanning speeds up to 200 inches per minute, variable scanning line spacing from one-sixteenth inch to one-quarter inch, and a scan length up to 64 inches. The collimator and radiation image detector are conveniently combined into the single radiation image probe 24, referred to above.

During the scanning by the probe 24, radiations, such as gamma rays, from the radioisotopes within the subject pass through the collimator channels 40 open to them and strike the scintillator 36. Many of these rays produce light flashes, while others will pass through the scintillator without producing a light flash. The gamma rays emanating from each radioisotope source may pass through one collimator channel or a plurality of adjacent channels, depending on the location of the source with respect to each collimator channel.

The gamma rays always travel in straight lines, unless scattered by intervening matter. Thus, when a radioisotope radioactive source is within the view of the scintillator 36 through the collimator holes 38, the area over which the flashes are distributed will depend upon the number of collimator channels which are lined up with the radioactive source. The walls of the collimator channels absorb nearly all gamma rays which impinge upon them. Each scintillation lasts only a fraction of a microsecond, and is sensed individually by the phototubes 32. The phototubes feed the resulting electrical impulses to the utilization circuitry of the invention in which the impulses are transformed into output signals which indicate the position and intensity (brightness) of each scintillation, as will be described.

The subject 20 is shown in FIG. 2 as divided into five planes A–E, and there are illustrated five radiation sources a–e in FIG. 2, each radiation source lying in the correspondingly lettered plane for purposes of illustration. The collimator of FIG. 2 is the focus type, incorporating an imaging scheme, such as described in the aforesaid Anger application. Such a collimator could be adapted for use in the system of the invention. However, a simpler approach is to use the collimator shown schematically in FIG. 3.

In the system shown schematically in FIG. 3, only two collimator channels 40a of a scanning head 24a are shown, although normally more would be used. In the head 24a of FIG. 3, each collimator 24a is coupled to a discrete detector deflector 32a. The discrete detector elements provide an indication of the gamma ray passage through the individual collimator channels. The output from the detectors are amplified in separate pulse amplifiers designated collectively as 100, and the individual outputs from the pulse amplifiers may be recorded on a magnetic tape 102 by separate record heads, such as the heads 104 and 106. The magnetic tape 102 in included in a tape recorder designated schematically as 108. It will be understood that a separate pulse amplifier 100 is provided for each of the separate detectors 32a, and a separate record head is provided for the output of each of the pulse amplifiers, with each output being recorded on a separate channel on the magnetic tape 102, although only two channels are shown in FIG. 3.

In FIG. 3, a gamma ray emitting radioisotope distributed in the region of activity, such as the subject 20 which, as mentioned above, in nuclear medical applications would be the body or organ of a patient, is rectilinearly scanned by the scanning head 24a, which contains the collimator channels 40a. The collimator channels are set at fixed inclinations within the scanning head 24a over a solid angular range, although only two such channels are shown in FIG. 3.

The gamma radiation emitted from a pencil-like region in the region of activity 20 and collimated by a corresponding collimator channel 40a is detected by the corresponding gamma ray detector 32a, as explained above. As also explained, two such detectors are shown in FIG. 3, although a greater number of such detectors would normally be used. The resulting output pulses produced by the detectors 32a by their absorption of gamma photons are amplified by the separate pulse amplifiers 100, and recorded in independent channels of a suitable memory device, such as on the magnetic tape 102 of the magnetic recorder 108 of FIG. 3.

As mentioned above, the magnetic recorder is a multichannel type, and although only two such channels are indicated on the magnetic tape 102, the number of channels required corresponds to the number of collimators in the scanning head 24a. The recording heads 104 and 106 record the signals introduced to them simultaneously in real time, so that the time coordinate for a signal recorded in channel 2, for example, is the same coordinate as that of the laterally displaced signal recorded in channel 1.

It will be appreciated, therefore, that when the collimator axes, as shown in FIG. 3, pass through points sources of gamma-emitting radioactivity, such as the points "a" and "b" in planes A and B in the body 20, which planes are assumed to be separated by a distance "d" in the particular illustration, the two collimator axes intersect in the plane A, but not in the plane B. Therefore, during the recording of the pulse outputs from the pulse amplifiers 100, in the equipment shown in FIG. 3, the pulses emitted by the two illustrated detectors 32a, as the axes of the collimator channels 40a intersect at the point "a" during the scanning of the head 24a from the left to the right in FIG. 3, will be recorded at the same time, whereas the pulses produced by the point source "b" will be recorded first by the righthand collimator channel 40a as its axis intersects the point b and then by the lefthand collimator channel 40a as its axis subsequently passes the point b. Appropriate electronics is included in the recording system, so that signals from the detectors 32a are recorded only when the scanning head 24a is moving in a particular direction and are blanked out during retrace movements of the scanning head, so as to avoid spurious recordings.

Figure 6:
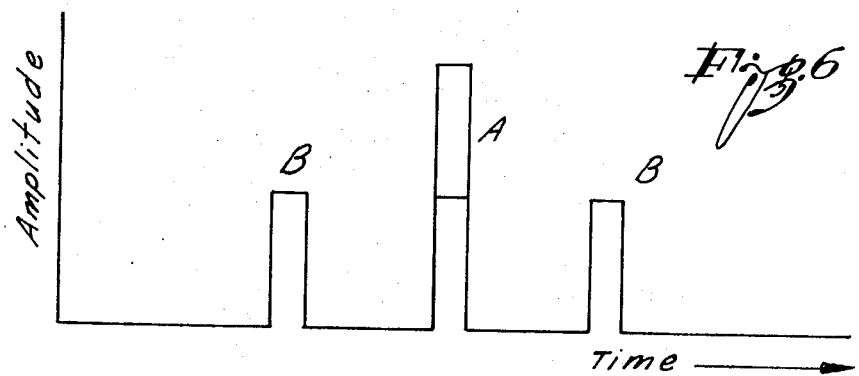
FIG. 6 is a wave form useful in explaining the operation of the invention.

The system shown schematically in FIG. 4 constitutes the tape recorder, or equivalent memory system, 108 of FIG. 3 during a playback mode, and during which both channels 1 and 2, for example, are read at the same time. During this mode, the transducer heads 104 and 106 function as read heads, and the signals sensed by these transducers are applied to an appropriate mixer represented by the block 200. Therefore, the system of FIG. 4 plays back the recordings made by the system of FIG. 3 on the same time coordinates, so that as shown in FIG. 6, for example, the head 106 first generates a pulse B, of a particular amplitude, corresponding to the sensing of the radioactive source b in he plane B, by the righthand collimator 40 in FIG. 3. Then, both the heads 104 and 106 sense the signal from the source a at the same time, so that during the playback in the system of FIG. 4, the mixer 200 generates a double amplitude pulse A, as shown in FIG. 6. Subsequently, the head 104 produces a second pulse B in FIG. 6 of the same amplitude as the original pulse B, and corresponding to the intersection of the lefthand collimator 40 in FIG. 3 with the radioactive point source b in the plane B.

Therefore, if the recording made on the tape 102 in the system of FIG. 3 is played back with the same time relation between the individual channels as it was recorded, for example, as shown in FIG. 4, the increase in the count rate passing through the mixer 200 (to an appropriate dot or photo recorder) as the collimator axes pass through point sources of gamma emitting radioactivity at points a and b in plane A and B respectively (FIG. 3), are indicated graphically in FIG. 6.

In the particular case under consideration, the collimators themselves are shown in FIG. 3 to be "focused" in the plane A, so that when the playback of FIG. 4 is made in real time correspondence with the recording of FIG. 3, the A plane is in focus, and all the point sources a encountered in that plane appear as double amplitude pulses, as shown in FIG. 6. That is, the graph of the playback of FIG. 4 in real relative time shows that the two pulses A are superimposed for a point source in the plane A, but appear at different times for a point source in the plane B, or in any other plane other than A, either above or below it.

Figure 5:
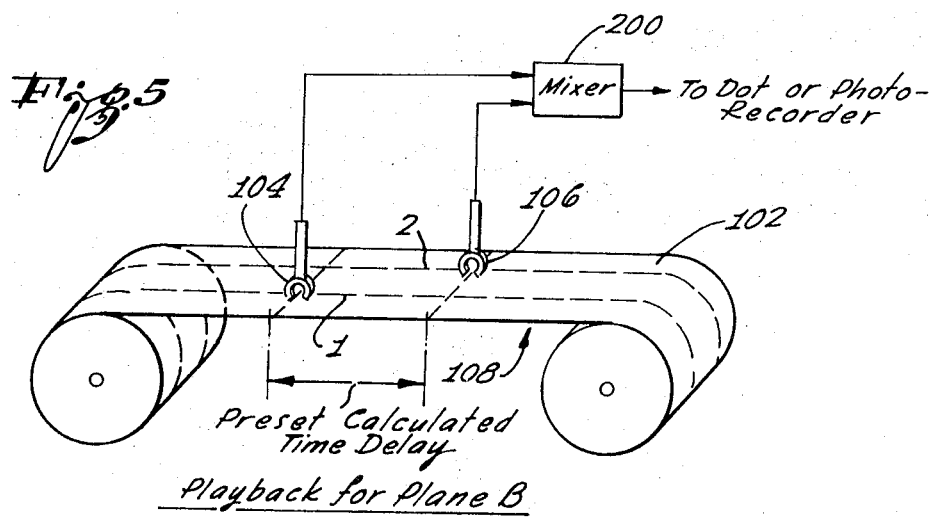
FIG. 5 is a schematic representation showing the manner in which the signals may be read in a second mode of operation of the system.

By designing and constructing a tape playback system in which the playback heads, such as the heads 104 and 106 in the system shown in FIG. 5, may be preset to any calculated time-staggered arrangement, then the signals recorded at different real times in the system of FIG. 3 can be played back to superimposed. Therefore, in the parlance of the art, the system of FIG. 4 will play back the information with plane A in focus, but with plane B, or any plane other than A, smeared out and "out of focus."

The time difference corresponding to any plane for any pair of collimators may be precalculated from the angles and coordinates of the collimator axes in the following manner.

The original scintillation scanners using single channel collimators had an extremely low gamma photon utilization efficiency, being of the order of $10^{-6}$ for a field of view containing of the order 1,000 resolution elements. The early introduction of the focusing collimator increased this efficiency by an approximate factor of about 30 to about $3 \times 10^{-5}$. The development of the scintillation camera where all resolution elements are viewed simultaneously albeit each with a very low efficiency raised the overall photon efficiency to the order of $2 \times 10^{-4}$. This efficiency can be approached in a mechanical scanning system by the use of large solid angle detectors, either with a large crystal assembly, a nested group of conventional size crystals or by scanning 10 channels simultaneously.

As larger crystals, subtending larger solid angles, were developed in mechanical scanners to obtain higher photon utilization efficiencies it became apparent that the effective depth of focus became smaller and images of distributions a short distance from the focal plane became smeared. Many regarded this as a practical disadvantage. However, the reduction of the depth of focus is concurrent with a large increase in sensitivity, thus enabling several planes to be scanned in a reasonable length of time with a considerable increase in tomographic information. Such a system was designed and built specifically for fast-section brain tumor scanning. Kuhl had previously developed a specialized brain section scanner and explored other sectioning methods but these were not combined with an extremely high sensitivity and speed (Radiology 71 (1958) 875). Certain types of sectioning can be made with a scintillation camera, usually involving rotation of the patient.

Anger has shown that in mechanical section scanning the information lost by smearing in the planes away from the focal plane can be recovered by means of a special optical system in conjunction with a scintillation camera type detector used with a focused collimator. The following analysis is an attempt to generalize the methods and systems that could be used to recover the larger amount of information smeared in high sensitivity section scanning. It turns out that if signals from individual collimating channels can be identified with the channel that a large number of new configuration and possibilities are suggested.

Consider a reference plane which for convenience can be clear from the distribution of activity to be scanned. The axis of the collimator channel intersects this plane at rectilinear coordinates $(x, y)$ at an angle $(\theta, \phi)$. $\theta$ is the polar angle of the axis of the collimator channel from a normal to the reference plane and $\phi$ is the azimuthal angle of the projection of the axis in the reference plane from the x-direction.

Consider an object plane parallel to the reference plane at a distance D from it and within the distribution of activity. Let X,Y be the rectilinear coordinates (X-axis parallel to x-axis; Y-axis parallel to y-axis, and X,Y origin on a normal through the x,y origin) of the intersection of the axis of the collimator channel with the object plane.

Then for a collimator indexed by $n$, $$X_n = x_n - D \cos \phi_n \tan \theta_n \quad (1)$$
$$Y_n = y_n - D \sin \phi_n \tan \theta_n \quad (2)$$

Suppose now that the collimator $n$ retains its polar angle $(\theta, \phi)$ while it scans with an $x$ component of velocity $v$ and a $y$ component $w$. That is $$x = x_o + vt \quad (3)$$
$$y = y_o + wt \quad (4)$$

Then $$X = x_o + vt - D \cos \phi \tan \theta \quad (5)$$
$$Y = y_o + wt - D \sin \phi \tan \theta \quad (6)$$

or the time when the collimator $n$ will look at $X$ is $$t(X_n) = 1/v \, [(X_n - x_n) + D \cos \phi_n \tan \theta_n] \quad (7)$$

and similarly for $t(Y_n)$.

The time difference between two independent collimators looking at $(X,Y)$ in the object at depth $D$ is then:

$$T_{nm}(X) = 1/v \, [x_{om} - x_{on} + D(\cos \phi_n \tan \theta_n - \cos \phi_m \tan \theta_m)] \quad (8)$$

and similarly for $T_{nm}(Y)$ with sin $\phi$ substituted for cos $\theta$.

If the axes of the collimators intersect in the object plane $D$ then:

$$T_{nm}(X) = 0 \qquad (9)$$

or the pair of collimators can be regarded as focused in the $D$ plane.

If the signals of the two collimators are recorded separately e.g., on magnetic tape, then in the focal plane, if it exists, the superposition of the recorded signals in real time can be used to obtain a focused image. However, the recorded signals can be superimposed in staggered time, determined by the above formulas and the replay then will be focused for the object plane $D$. At first sight the staggered time superposition appears to offer a difficulty as there are in general, two different time differences, the $X$ difference and the $Y$ difference. This means that the memory (e.g. tape) must be indexed for two time differences. There are many way of doing this, the most obvious being that of identifying the $Y$ difference with a number of spacing intervals in a rectilinear scan. However, in a to-and-fro rectilinear scan the $X$ difference is alternately positive and negative, a fact which must be taken care of in the staggered time playback system.

This general analysis indicates that staggered time playback can be theoretically achieved without any pair of collimator axes intersecting or focusing in any plane. In another interesting limiting case the collimators or subsets of collimators can all intersect in the reference plane. What makes this possibility so attractive is that the collimations can be attained by a pinhole aperture in a relatively light weight lead sheet placed in the reference plane, making it unnecessary to make heavy channeled collimators. The position in the pinhole image on the crystal or array of individual detectors determines the axis of an effective channel along with the center of the pinhole. At the present time a scanning pinhole or group of pinholes appears to be the most practical arrangement to take advantage of staggered-time scanning. Suitably rapid time-stagger playback scanning would enable all planes to be exhibited in a three-dimensional display.

In Angr's multisection scanning system proposal the identification of the collimator channel is made by the electronic computing of the position of the scintillations in the crystal plate, similarly to the determination of real position in the scintillation camera.

With a pinhole scanner the same identification can be used or an array of individual detectors can be used. If and when useful solid state detectors are evolved, this would appear to be a natural application of them. Presumably they could greatly reduce scatter background for resolution in a surrounding sea of activity.

In the pinhole collimator arrangement $x_{on} = x_{om}$ for every pair $(n,m)$, and similarly for $y_o$.

Then $$T_{nm}(X) = D/v (\cos \phi_n \tan \theta_n - \cos \phi_m \tan \theta_m) \qquad (10)$$

and similarly for $T_{nm}(Y)$.

For a circular zone of angle $\theta$ in the pinhole image $$T_{nm}(X) = 1/v\, D \tan \phi(\cos \theta_n - \cos \theta_m) \qquad (11)$$

and similarly for $T_{nm}(Y)$. Thus it is relatively simple to use $\theta$ as one of the classification indices in the memory and to compute and adjust time-staggers for crosstime correlation playback.

An important feature of the invention is that the same tape recording may be played with any precalculated staggering between the heads, such as the heads 104 and 106, or with any equivalent means for controlling the time relationship between the signals played back from the different channels, so as to obtain any desired plane in focus while defocusing the other planes. The depth of focus is determined primarily by the angular range of the collimators, and it approaches the collimator resolution for a sufficiently large angular range.

In general, the concept of staggered time playback as described above is mathematically one of crosstime correlation of individual recordings, and may be achieved in many ways, as mentioned above. However, the adjustments of time-stagger settings for the playback may be accomplished most simply by the mechanical relative displacement of the playback heads, such as the heads 104 and 106 in FIG. 5. However, the same effect could be achieved by means, for example, of a fixed array of playback heads which are switched electronically to the mixer. This latter technique would enable a simultaneous exhibit of several planes focused for a three-dimensional display system. Accurate rectilinear coordinates may then readily be determined for any feature of the radioactivity distribution.

It will be appreciated that although the collimators in FIG. 3 are shown as "focused" on the plane A, there is no need for any of the collimators actually to be focused, since any plane may be selected by the appropriate control of the playback timing of the signals recorded in the various channels.

What is claimed is:

1. Apparatus for obtaining a radiation distribution read-out of a plurality of radiating sources within a subject during a single scan of the subject, the radiating sources being positioned in different planes within the subject, said apparatus including:

a scanning head including at least two inclined collimator channel members having respective axes intersecting in a particular plane relative to the aforesaid different planes, said collimator channel members providing individual passages for the radiation from the individual radiating sources of the aforesaid plurality of radiating sources, the radiation from any one of said sources passing through the respective collimator channel members during the scanning process with a relative time displacement determined by the position of the respective plane of the particular radiating source relative to the aforesaid particular intersecting plane;

a corresponding plurality of radiation detectors coupled to respective ones of said collimator channel members for producing outputs corresponding to the radiations passed thereby;

memory means coupled to said radiation detectors for storing the outputs produced thereby, said memory means comprising a storage medium on which the outputs from said radiation detectors are recorded on different channels; and transducer heads coupled to the respective channels of said medium for subsequently reproducing the outputs stored therein with predetermined time relationship, said time relationship being adjustable to bring any one of the aforesaid planes into focus and to de-focus all other planes in the aforesaid subject.

2. The apparatus defined in claim 1 in which said radiating sources comprise radioisotopes within the subject which radiate gamma rays.

3. The apparatus defined in claim 1 in which said radiation detectors comprise photodiode detectors for converting light rays incident thereon into corresponding electrical signals.

4. The apparatus defined in claim 1 in which said memory comprises a magnetic medium on which the outputs from said radiation detectors are recorded on different channels, and in which said transducer heads are electromagnetic transducers.

5. The combination defined in claim 4 in which said magnetic medium comprises a magnetic tape.

6. The apparatus defined in claim 4 in which said sensing means comprise electromagnetic transducer heads coupled to the respective channels of said magnetic medium.

7. The apparatus defined in claim 1 in which said transducer heads are physically adjustable with respect to one another to provide any predetermined time displacement between the sensing thereby of the signals recorded in the channels on the aforesaid magnetic medium.

* * * * *